Patented May 14, 1935

2,001,526

UNITED STATES PATENT OFFICE 2,001,526

AZO DYES AND METHOD FOR THEIR PREPARATION

Miles Augustinus Dahlen, Wilmington, Del., assignor to E. I. du Pont de Nemours & Company, Wilmington, Del., a corporation of Delaware No Drawing. Application March 30, 1933,
Serial No. 663,551

12 Claims. (Cl. 260—77)

This invention relates to new azo dyes and more particularly refers to water insoluble disazo dyes having the following general formula:

$$N=N-A-NHCO-X-CONH-A-N=N$$
$$\phantom{N=N-A-NHCO-X-CONH-A-N=}R\phantom{=N-A-NHCO-X-CONH-A-N=}R$$

in which A represents a meta-arylene nucleus of the benzene or naphthalene series, X represents an arylene nucleus of the benzene, naphthalene, diphenyl or diphenyl-ether series, and R represents the residue of an ice color coupling component.

It is an object of the present invention to prepare insoluble azo dyestuffs in substance or on the fiber. A further object is to prepare dyes which are well adapted for use in "one-bath" dyeing processes. A still further object is to produce bright attractive dyes which impart shades of satisfactory fastness to textile fibers when prepared thereon. Additional objects will become apparent from a consideration of the following description.

These objects are attained according to the herein described invention wherein aromatic diamines having the following general formula:

$$NH_2-A-NHCO-X-CONH-A-NH_2$$

are tetrazotized and coupled with an ice color coupling component. In this formula the terms A and X have the same meanings as heretofore given.

The invention may be more completely understood by a consideration of the following illustrative examples, in which the quantities are stated in parts by weight:

Example 1

Cotton skeins, impregnated in the usual manner with the meta-nitranilide of 2,3-hydroxynaphthoic acid, were developed in a tetrazo bath prepared as follows:

17.3 parts of N,N'-di-(3-aminophenyl)-terephthalamide were stirred with 30 parts of hydrochloric acid of 30% strength and 350 parts of cold water, and the base tetrazotized with 7 parts of sodium nitrite dissolved in 30 parts of water. When tetrazotization was complete, the solution was filtered and the mineral acidity neutralized with sodium acetate.

When the development of the color in the above bath was complete, the skeins were rinsed, soaped at the boil, rinsed and dried.

By this process a bright red-scarlet dyestuff of the probable structure:

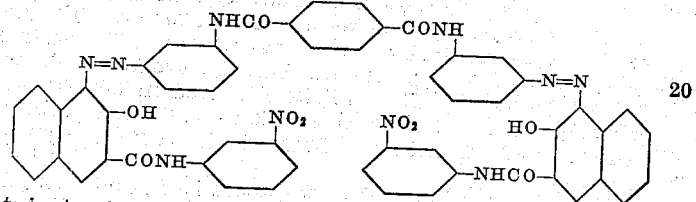

is obtained. The color possesses fair fastness to light and washing.

Example 2

Cotton skeins, impregnated in the usual manner with the meta-nitranilide of 2,3-hydroxynaphthoic acid, were developed in a tetrazo bath prepared from N,N'-di-(3-aminophenyl)-phthalamide by the method given in Example 1. After the development, and the rinsing and soaping of the skeins, a red-scarlet dyeing of fair fastness to light and washing was obtained.

The dye probably has the following formula:

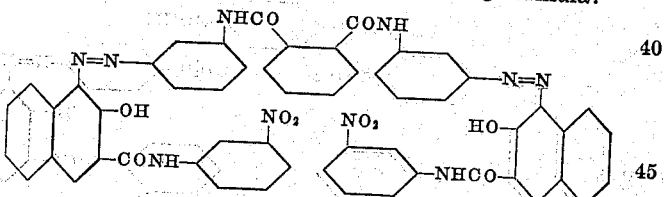

Example 3

Cotton skeins, impregnated in the usual manner with the alpha-naphthalide of 2,3-hydroxynaphthoic acid, were developed in a tetrazo bath prepared as follows:

18.7 parts of N,N'-di-(4-methyl-3-aminophenyl)-terephthalamide were stirred in 30 parts of hydrochloric acid of 30% strength and 350 parts of cold water, and the base tetrazotized with 7 parts of sodium nitrite dissolved in 30 parts of water. When tetrazotization was complete, the solution was filtered and the mineral acidity neutralized with sodium acetate.

When the development of the dyestuff was complete, the skeins were soaped and rinsed as before. By this process a red dyestuff of fair fastness to light and good fastness to washing was obtained. The dyestuff has the probable formula:

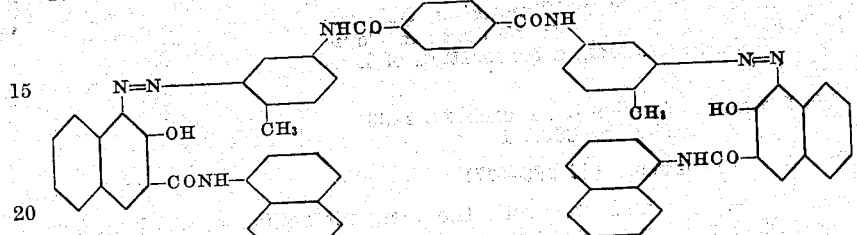

*Example 4*

Cotton skeins, padded in the usual manner with the alpha-naphthalide of 2,3-hydroxynaphthoic acid, were developed in a tetrazo bath prepared as follows:

20.3 parts of N,N'-di-(2-methoxy-5-aminophenyl)-terephthalamide were stirred in 30 parts of hydrochloric acid of 30% strength and 350 parts of cold water, and the base tetrazotized with 7 parts of sodium nitrite dissolved in 30 parts of water. The tetrazo solution was filtered and the mineral acidity neutralized with sodium acetate.

After the development in the above bath, and the rinsing and soaping of the skeins, a red Bordeaux dyeing of fair fastness to light and washing was obtained. The dye probably possesses the following formula:

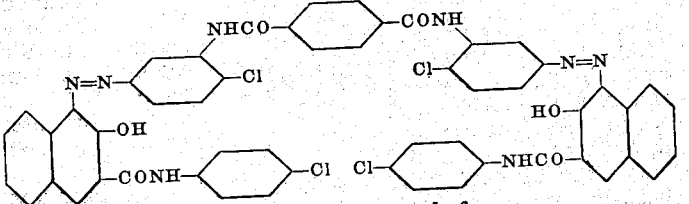

*Example 5*

Cotton skeins, padded in the usual manner with the parachloranilide of 2-3-hydroxy-naphthoic acid, were developed in a tetrazo bath prepared as follows:

20.7 parts of N,N'-di-(2-chloro-5-aminophenyl)-terephthalamide were stirred in 30 parts of hydrochloric acid of 30% strength and 350 parts of cold water, and the base tetrazotized with 7 parts of sodium nitrite dissolved in 30 parts of water. The tetrazo solution was filtered and the mineral acidity neutralized with sodium acetate.

After the development in the above bath, and the rinsing and soaping of the skeins, a scarlet-red dyeing of good fastness to washing was obtained. The dye probably possesses the following formula:

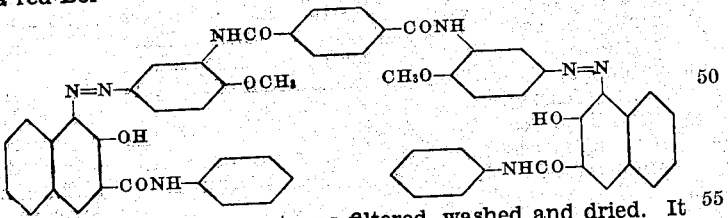

*Example 6*

A solution of the anilide of 2,3-hydroxy-naphthoic acid was prepared by stirring 10 parts of the anilide with 5 parts of alcohol, adding 25 parts of sodium hydroxide of 25% strength and 500 parts of water. A tetrazo solution prepared from N,N'-di-(2-methoxy-5-aminophenyl)-terephthalamide was prepared as in Example 4. An equivalent quantity of the tetrazo solution was added to the solution of the anilide, resulting in coupling to form the insoluble pigment possessing the following constitution:

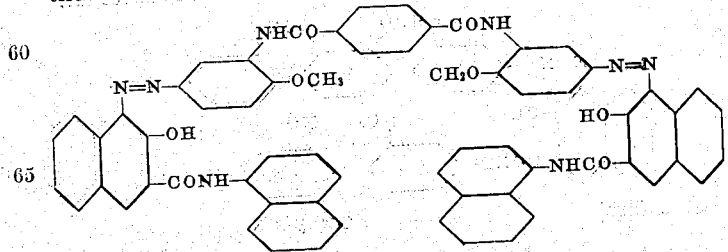

The pigment was filtered, washed and dried. It formed a violet powder, which dissolved in concentrated sulfuric acid to a bluish-violet solution.

*Example 7*

18.7 parts of N,N'-di-(4-methyl-3-aminophenyl)-terephthalamide were stirred in 30 parts of hydrochloric acid of 30% strength and 350 parts of cold water, and the base tetrazotized by the addition of 7 parts of sodium nitrite dissolved in 30 parts of water. When tetrazotization was complete, the solution was filtered. 18 parts of the sodium salt of piperidine-alpha-carboxylic acid were then added, followed by sufficient sodium carbonate solution to render the mass strongly alkaline to Brilliant Yellow papers. When interaction to form the diazoimino compound was complete, as shown by a negative test for tetrazo salt, the mass was saturated with sodium chloride. The diazoimino compound thus precipitated was separated and dried at a low temperature. It was a tan solid which was very soluble in water and alkalies, and has the probable formula:

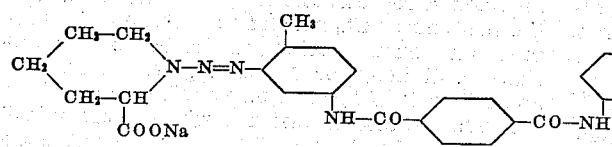

A printing powder was prepared by the mechanical mixture of equal parts of the above diazoimino compound and the alpha-naphthalide of 2,3-hydroxy-naphthoic acid. A printing paste was then made up according to the following formula:

13 parts of the printing powder
3 parts of Turkey red oil
5 parts of caustic soda of 30% strength
67 parts of starch tragacanth thickener
12 parts of water heated to 160° F.

100

Cotton piece goods were printed from an engraved copper roll with the above paste. The printed fabric was then subjected to the action of live steam containing the vapors of acetic acid, at a temperature of about 212° F. Rapid development of the pattern to a deep red of good fastness properties was thus effected. The goods were soaped, rinsed and dried. The dyestuff was identical in formula with that obtained according to Example 3.

It is readily apparent that other secondary amines containing water solubilizing groups may be used in preparing the diazoimino compound suitable for use in the above and related printing processes. Following is a list of a few representative amines which may be substituted for piperidine-alpha-carboxylic acid:

CH₃NHCH₂COOH    "sarcosine"
CH₃CH₂NHCH₂CH₂SO₃Na    "ethyl-taurine"
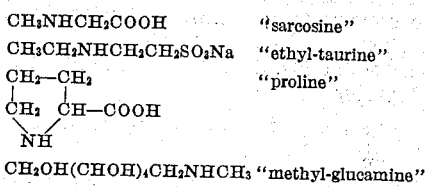    "proline"

CH₂OH(CHOH)₄CH₂NHCH₃  "methyl-glucamine"

It is, of course, to be understood that the components of the aforementioned examples are merely a few of the many which come within the terms of the present invention and which may be used with very satisfactory results. For example, the component heretofore designated by A is a meta-arylene nucleus of the benzene or naphthalene series. This nucleus may be further substituted by alkyl, alkoxy, halogen and other groups having similar effects, but should be free from groups which render the resulting dyestuffs water soluble, such as carboxylic and sulfonic acid groups.

The component designated by X is an arylene nucleus of the benzene, naphthalene, diphenyl or diphenyl-ether series. This component likewise may be further substituted, for instance by alkyl, alkoxy and halogen groups; but should be free from groups which render the resulting dyestuffs water soluble, such as carboxylic and sulfonic acid groups.

The ice color coupling component, designated by R in the general formula given supra, is preferably an arylamide of 2-3-hydroxy-naphthoic acid. However, quite satisfactory results may be obtained by substituting for this arylamide, arylamides of the following compounds:

Hydroxy-carbazole-carboxylic acids
Hydroxy-naphtho-carbazole-carboxylic acids

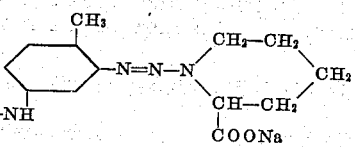

Hydroxy-anthracene-carboxylic acids
Hydroxy-diarylamine-carboxylic acids
Alkyl-amino- and aryl-amino - 2 - hydroxy-naphthalene-3-carboxylic acids Likewise, other ice color coupling components such as acylacetyl derivatives of arylamines and arylene diamines, alpha- and beta-naphthol, alpha-naphthol substituted in the 4-position by acyl groups, aryl-alkyl-pyrazolones, and dihydroxy-quinolines, fall within the scope of this invention and may be used with good results.

The diamines which are tetrazotized to form the diazo salts described herein may be obtained by various well known methods, among which may be mentioned the following:

A meta-nitro-arylamine of the formula:

is condensed with an arylene-dicarbonyl-chloride of the formula:

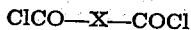

This results in the formation of a dinitro compound having the following general formula:

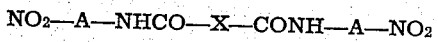

which compound upon reduction according to well known methods, such as by the action of iron and an acid or by liquid phase hydrogenation over suitable catalysts, is converted to the diamino compound previously referred to.

In carrying out the synthesis of these diamines an exceedingly wide range of compounds may be used, resulting in the production of numerous and attractive shades in the finished products. For instance, representative meta-nitro-arylamines selected from the large group which are suitable for use in the preparation of the new diamines used in the present invention are:

Meta-nitraniline
3-Nitro-4-chloro-aniline
4-Nitro-2-amino-toluene
4-Nitro-2-amino-anisole
6-Nitro-4-amino-1-3-dimethyl-benzene
2-Nitro-4-amino-toluene
2-Nitro-4-amino-anisole
2-Chloro-4-amino-6-nitro-toluene
3-Nitro-1-naphthylamine
1-Chloro-2-amino-4-nitro-naphthalene Representative arylene-dicarbonyl-chlorides selected from among those which may be used in producing the new diamines comprised within the scope of the present invention are:

Ortho-, meta-, and para-benzene-dicarbonyl-chlorides
2-Methyl-benzene-1,4-dicarbonyl-chloride
2-Chloro-benzene-1,4-dicarbonyl-chloride
2-Methoxy-benzene-1,4-dicarbonyl-chloride
Naphthalene-1,4-dicarbonyl-chloride
Naphthalene-1,8-dicarbonyl-chloride
Diphenyl-4,4'-dicarbonyl-chloride
Diphenyl-2,2'-dicarbonyl-chloride
Diphenyl-ether-4,4'-dicarbonyl-chloride Concerning the resulting diamines, mention may be made of the following which are of particular interest in the manufacture of the new dyestuffs:

N,N'-di-(2,4-dimethyl-5-amino-phenyl)-terephthalamide
N,N'-di-(2,5-diethoxy-3-amino-phenyl)-terephthalamide
N,N'-di-(2-methyl-5-methoxy-3-amino-phenyl)-phthalamide
N,N'-di-(3-amino-phenyl)-diphenyl-4,4'-dicarbonylamide
N,N'-di-(3-amino-6-methyl-phenyl)-naphthalene-1,4-dicarbonylamide
N,N'-di-(3-amino-naphthyl)-meta-phthalamide
N,N'-di-(3-amino-6-methoxy-phenyl)-diphenyl-ether-4,4'-dicarbonylamide.

In the selection of the ice color coupling components, as previously mentioned, there is an almost equally wide range from which to choose. In the selection of these components the arylamides of 2,3-hydroxy-naphthoic acid are preferred. Among the most satisfactory of these arylamides reference may be made to the anilides, toluidides, anisidides, phenetidides, naphthalides, nitranilides, tolidides, dianisidides, the 4'-carboxanilido-anilides, and other derivatives produced by substituting non-water solubilizing groups, such as halogen, alkyl, nitro, amino, alkoxy, alkylamino, and arylamino groups thereon.

The dyes described herein are readily applied by the "one-bath" method of dyeing, wherein mixtures of the water soluble diazoimino derivatives of the tetrazotized diamino compounds with the coupling component are impregnated on the fiber, and developed thereon by treatment with live steam and acetic acid vapors. Bright attractive colors of satisfactory fastness are imparted to the fibers by utilizing these compounds according to the "one-bath" method or according to the much older method wherein the fibers are impregnated with the coupling component and developed with the diazo salt. Furthermore, the products may be produced in substance and used as pigments. As is quite apparent from a consideration of the preceding description, the choice of components is exceptionally large and results in the production of a wide variety of very desirable colors.

As many apparently widely different embodiments of this invention may be made without departing from the spirit and scope thereof, it is to be understood that I do not limit myself to the specific embodiments thereof except as defined in the appended claims.

I claim:
1. A process for making insoluble azo dyes which comprises tetrazotizing and coupling a diamine having the following general formula:

NH₂—A—NHCO—X—CONH—A—NH₂ in which A represents a meta-arylene nucleus of the benzene or naphthalene series and X represents an arylene nucleus of the benzene, naphthalene, diphenyl or diphenyl-ether series, with an ice color coupling component.

2. The process of claim 1 wherein the nuclei represented by A and X may have substituted thereon members selected from the class consisting of alkyl, alkoxy and halogen groups.

3. A process for making insoluble azo dyes which comprises tetrazotizing and coupling a diamine having the following general formula:

NH₂—A—NHCO—X—CONH—A—NH₂ in which A represents a meta-arylene nucleus of the benzene or naphthalene series and X represents an arylene nucleus of the benzene, naphthalene, diphenyl or diphenyl-ether series, with an arylamide of 2,3-hydroxy-naphthoic acid.

4. The process of claim 3 wherein the nuclei represented by A and X may have substituted thereon members selected from the group consisting of alkyl, alkoxy and halogen; and wherein the arylamide is derived from an arylamine selected from the group consisting of amino-benzenes and amino-naphthalenes, which amines may have substituted thereon members selected from the group consisting of alkyl, alkoxy, halogen and nitro.

5. A process for making insoluble azo dyes which comprises tetrazotizing and coupling a diamine having the following general formula:

NH₂—A—NHCO—X—CONH—A—NH₂ in which A represents a meta-arylene nucleus of the benzene series and X represents an arylene nucleus of the benzene series, with an arylamide of 2,3-hydroxy-naphthoic acid.

6. A process for making insoluble azo dyes which comprises tetrazotizing and coupling a diamine having the following general formula:

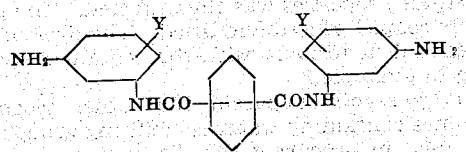

in which Y represents a hydrogen, halogen, alkyl or alkoxy group, with an arylamide of 2,3-hydroxy-naphthoic acid, wherein the arylamide is derived from an arylamine selected from the group consisting of amino-benzenes and amino-naphthalenes.

7. Insoluble azo dyes having the following general formula:

N=N—A—NHCO—X—CONH—A—N=N
|                                                  |
R                                                  R in which A represents a meta-arylene nucleus of the benzene or naphthalene series, X represents an arylene nucleus of the benzene, naphthalene, diphenyl or diphenyl-ether series, and R represents the radical of an ice color coupling component.

8. Insoluble azo dyes having the following general formula:

N=N—A—NHCO—X—CONH—A—N=N
|                                                  |
R                                                  R in which A represents a meta-arylene nucleus of the benzene or naphthalene series, which may have substituted thereon members selected from the group consisting of alkyl, alkoxy and halogen, X represents an arylene nucleus of the benzene, naphthalene, diphenyl or diphenyl-ether series, which may have substituted thereon members selected from the group consisting of alkyl, alkoxy and halogen, and R represents the radical of an ice color coupling component.

9. Insoluble azo dyes having the following general formula:

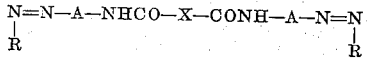

in which A represents a meta-arylene nucleus of the benzene or naphthalene series, X represents an arylene nucleus of the benzene, naphthalene, diphenyl or diphenyl-ether series, and R represents the radical of an arylamide of 2,3-hydroxy-naphthoic acid.

10. Insoluble azo dyes having the following general formula:

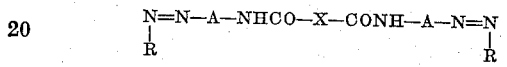

in which A represents a meta-arylene nucleus of the benzene or naphthalene series, which may have substituted thereon members selected from the group consisting of alkyl, alkoxy and halogen, X represents an arylene nucleus of the benzene, naphthalene, diphenyl or diphenyl-ether series which may have substituted thereon members selected from the group consisting of alkyl, alkoxy and halogen, and R represents the radical of an arylamide of 2,3-hydroxy-naphthoic acid wherein the arylamide is derived from an arylamine selected from the group consisting of amino-benzenes and amino-naphthalenes, which amines may have substituted thereon members selected from the group consisting of alkyl, alkoxy, halogen and nitro.

11. Insoluble azo dyes having the following general formula:

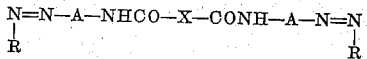

in which A represents a meta-arylene nucleus of the benzene series, X represents an arylene nucleus of the benzene series and R represents the radical of an arylamide of 2,3-hydroxy-naphthoic acid.

12. Insoluble azo dyes having the following general formula:

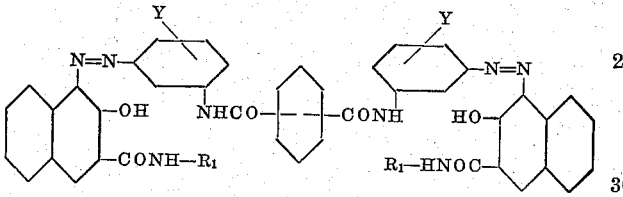

is which $R_1$ represents an aromatic radical of the benzene or naphthalene series, and Y represents a hydrogen, halogen, alkyl or alkoxy group.

MILES AUGUSTINUS DAHLEN.